Feb. 3, 1942.  R. F. MORRISON ET AL  2,271,801
MOISTENING MECHANISM
Filed Aug. 3, 1939  3 Sheets-Sheet 1
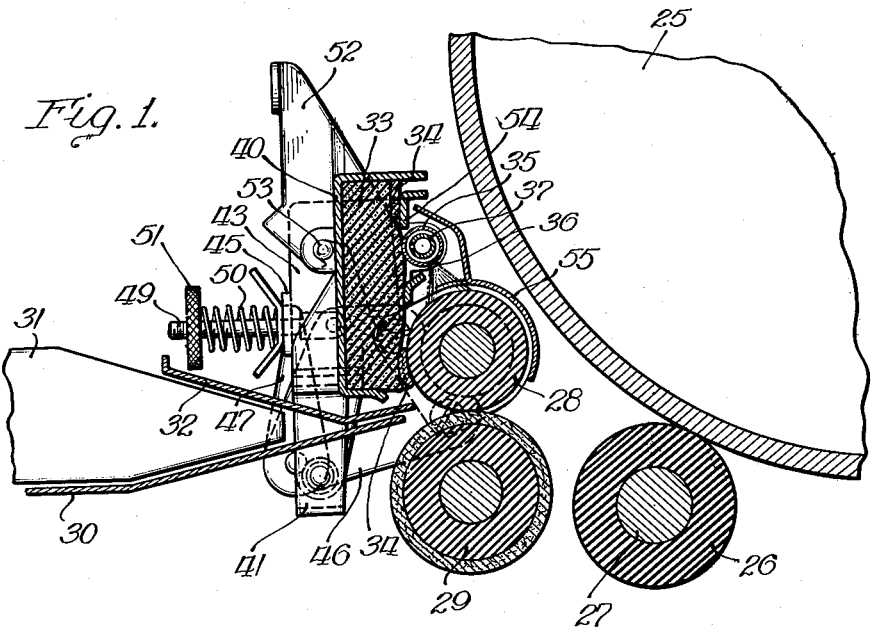
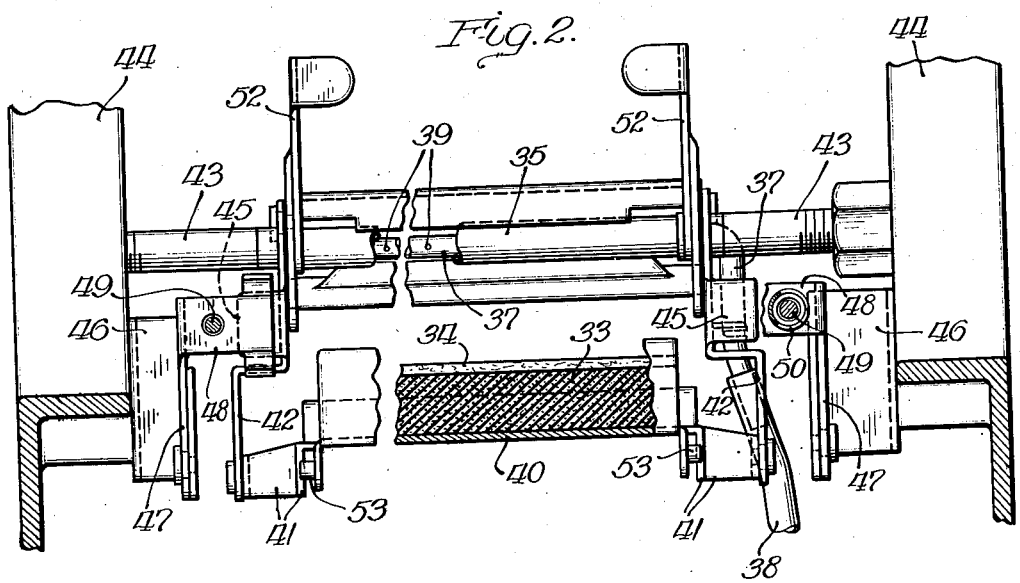

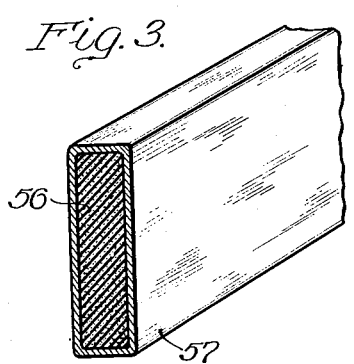
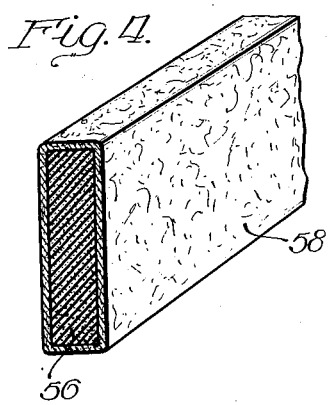
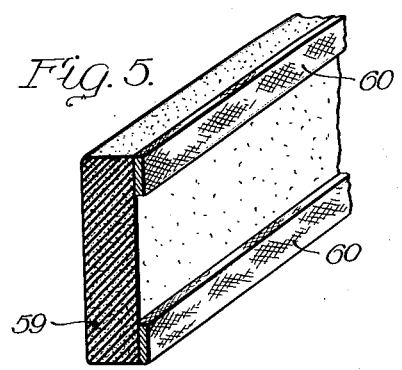
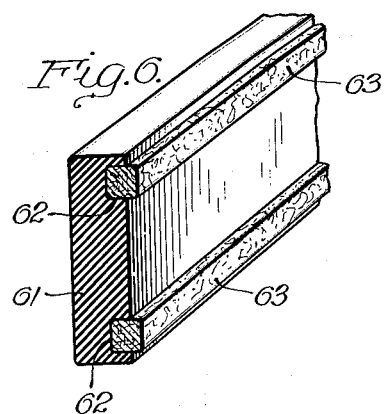
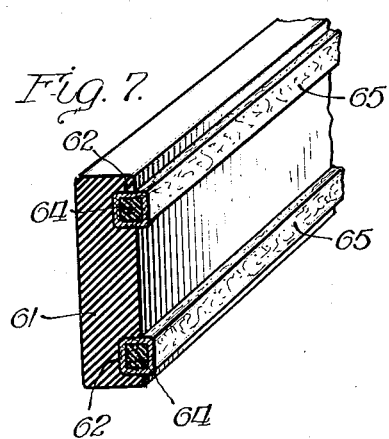
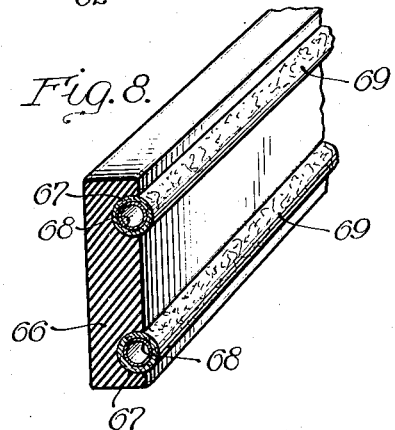

Feb. 3, 1942.     R. F. MORRISON ET AL     2,271,801
MOISTENING MECHANISM
Filed Aug. 3, 1939     3 Sheets-Sheet 3
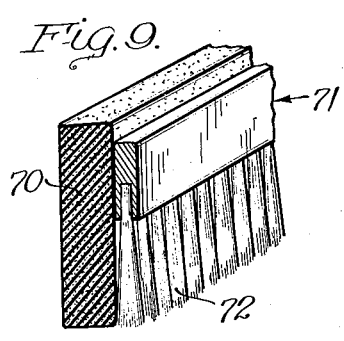
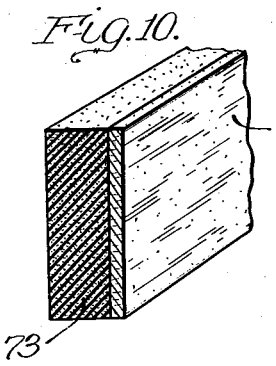
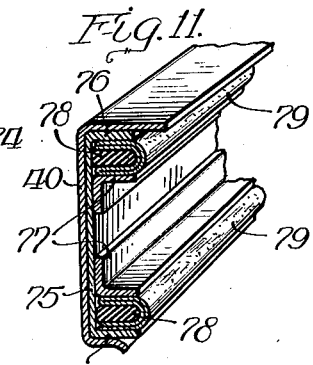
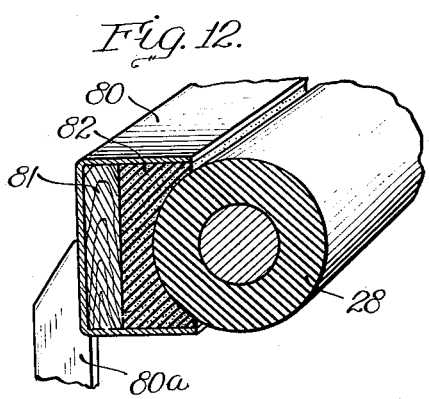
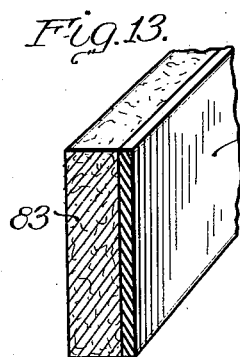
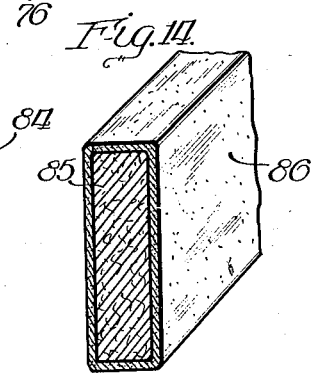
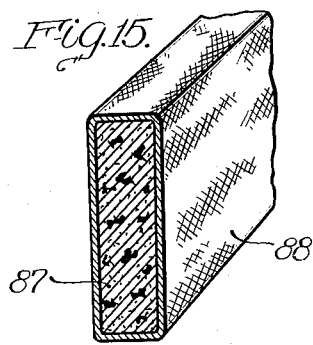
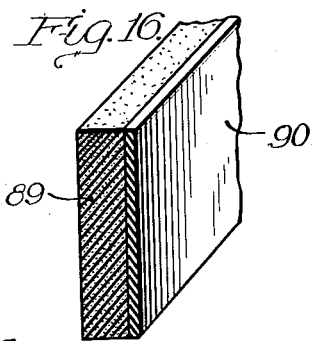
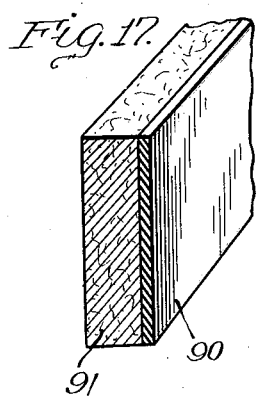
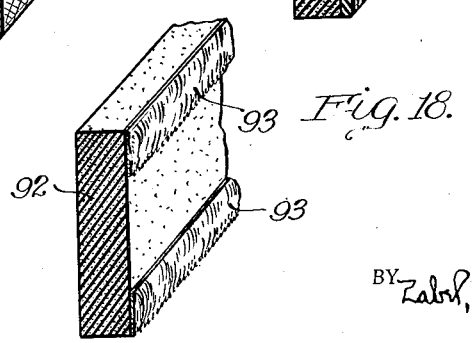
INVENTORS:
Robert F. Morrison
and Eric W. Peterson
BY Zabel, Carlson, Fritzbaugh and Wiles,
ATTORNEYS.

Patented Feb. 3, 1942

2,271,801

UNITED STATES PATENT OFFICE 2,271,801

MOISTENING MECHANISM

Robert F. Morrison and Eric W. Peterson, Oak Park, Ill., assignors to Ditto, Incorporated, Chicago, Ill., a corporation of West Virginia Application August 3, 1939, Serial No. 288,194

14 Claims. (Cl. 91—48)

This invention relates to moistening mechanisms of a type adapted for use in connection with liquid process duplicating machines for applying a solvent upon a roller provided for feeding copy sheets into the machine so as to apply a thin film of the solvent to the face of each copy sheet in turn as it moves forwardly. It is the object of the invention to provide a new and improved form and arrangement of parts by which improved results shall be obtained in the application of solvent to the roller in the form of a film for transfer to the copy sheets.

In most of the several forms of arrangement shown, a unit form of device is employed, comprising a cushion of rubber, felt, cork, wood, or the like, with two wiper parts mounted on a selected face of the cushion near its opposite edges, such wiper parts being formed of felt, chamois, suede, cloth, fur, or rubber, and arranged so that said wiper parts may by a reversal of the position of the cushion upon its support be brought alternatively into engagement with the sheet forwarding roller for effecting an even distribution of solvent fed to the roller. In some forms of the device, the two wiper parts at opposite edges of the cushion member are formed separately from each other, while in other forms said two wiper parts comprise merely the contact portions of a bearing face member extending entirely across the selected face of the cushion. In at least one form shown, the wiper part is in the form of a brush adapted to operate in only one position of the cushion, and in another form contact is maintained with the roller across substantially its entire face. In most of the forms illustrated, the wiper parts are formed of absorbent material, but in some instances the wiper parts are of yielding material but not absorbent.

In all of the forms of the device as shown, the cushion is in the form of a bar having the wiper parts combined therewith in unit form so as to be readily insertable in position in the supporting member. In some of the forms of the device, the wiper parts are in the form of tubes of absorbent material mounted about the cushion bar and arranged so as to permit the unit to be placed in any of four equally effective positions.

It is one of the objects of this invention to improve moistening mechanisms of this type in sundry details as hereinafter pointed out. The preferred means by which the several objects of the invention have been attained are illustrated in the accompanying drawings, in which—

Fig. 1 is a vertical sectional view shown diagrammatically through a portion of a duplicating machine;

Fig. 2 is a front face view of some of the parts as shown in Fig. 1 but with the moistening pad and its supporting means swung downwardly out of normal operative position, and with some of the parts shown in vertical section;

Figs. 3 to 10 inclusive show in vertical cross section modified forms of unit moistening pad structures adapted for use with the pad mounting means of the machine as shown in Figs. 1 and 2;

Fig. 11 is a vertical cross sectional view through still another modified form of unit moistening pad means mounted in position in a suitable supporting device of the type illustrated in Figs. 1 and 2;

Fig. 12 is a vertical cross sectional view through still another modified form of moistening device applied in position upon a sheet feeding roller; and Figs. 13 to 18 inclusive are vertical cross sectional views through other modified forms of unit moistening pad structures adapted for use with the pad mounting and supporting means of the machine as shown in Figs. 1 and 2.

Referring now to Figs. 1 and 2 of the drawings, 25 indicates the drum of a liquid process duplicating machine of any suitable type. Below the drum 25, there is an impression roller 26 rotatably mounted in position by means of a shaft 27 as is usual in machines of this type. At a short distance in rear of the platen or impression roller 26 (at the left in Fig. 1), two rollers 28 and 29 are rotatably mounted in cooperative relation to each other for feeding a copy sheet toward the right in said Fig. 1 into engagement between the drum 25 and the platen 26. The roller 28 is of course to be driven at the same surface speed as that at which the drum 25 is driven, such parts being driven by any suitable means not shown. In rear of the feed rollers 28 and 29, a table 30 is provided, having side guide plates 31 and a top guide plate 32 thereon for directing sheets of paper to the bite of the feed rollers 28 and 29.

The means as shown in Figs. 1 and 2 for applying a quantity of solvent upon the face of the roller 28 comprises a bar 33 of sponge rubber provided with strips 34 of felt at opposite edge portions of its front face, the lower one only of the two felt strips 34 being held in engagement with the face of the roller 28 as hereinafter described. Solvent is applied to the face of the roller 28 by means of a pipe 35 fixedly mounted in position and having a series of openings 36 through its wall, only one of such openings being shown in Fig. 1. In the arrangement shown, the solvent is delivered to the pipe 35 by means of a second pipe 37 positioned inside of the pipe 35, the pipe 37 being connected by a suitable tube 38 with any suitable source of solvent under pressure. As is shown in Figs. 1 and 2, the pipe 37 is provided with openings 39 in its wall for the escape of the solvent from said pipe 37 into the interior of the pipe 35. In the arrangement shown, the openings 36 are so positioned as to cause the solvent to be sprayed from the pipe 35 directly on the face of the roller 28.

The means for supporting the moistening pad unit comprising the bar 33 and the strips 34 includes a supporting member 40 in the form of a channel made of sheet metal bent into form. This supporting means is substantially in accordance with the showing of a prior application in the name of Morrison, Serial No. 285,492, and forms no part of this present invention. The construction and operation of the supporting means will accordingly be described very briefly.

In the arrangement shown, the channel member 40 is provided at opposite ends with downwardly extending arm portions 41 which are pivotally connected at their lower ends with plates 42 which in turn are pivotally mounted upon bolts or pins 43 extending inwardly from the adjacent frame bars 44 of the machine, each of such plates 42 being provided with an outwardly extending lug 45 at its front edge portion. Below the pins 43, brackets 46 are provided for pivotally supporting arms 47 which are provided with inwardly extending plate portions 48 which engage the front faces of the lugs 45. Pins or bolts 49 are pivotally mounted upon the brackets 46 and extend rearwardly through openings in the plates 48, having coiled springs 50 mounted on their rear end portions between the plates 48 and thumb nuts 51 secured by means of screwthreads on said pins 49. The arrangement is such that when the nuts 51 are adjusted longitudinally of the pins 49, the pressure of the springs 50 upon the arms 47 and the plates 48 is varied for applying a controlled pressure upon the lugs 45 and the plates 42. The arrangement is such that with the parts in the position as shown in Fig. 1 the springs 50 apply a forward pressure upon the lower edge portion of the bar 33 for pressing the wiper strip 34 with an adjustable degree of pressure against the roller 28.

Latch means 52 are pivotally mounted upon the plates 42 in any suitable manner adapted by engagement with pins 53 carried by the supporting member 40 for holding such supporting member in elevated position as shown in Fig. 1. When access is desired to the bar or cushion 33 and the wiper members 34 for adjusting or replacing them, the latches 52 may be released from the pins 53 whereupon the supporting member 40 is adapted to swing rearwardly and downwardly into the position as shown in Fig. 2, the table 30 and its connected parts being first removed from the machine.

In the construction illustrated, the plates 42 are connected together by a cross plate bar 54 for holding the parts rigidly in position with respect to each other and for providing a stop for limiting the upward and forward swinging movement of the support 40 and the bar 33 carrying the wiper members 34. A shield 55 is also provided between the spray mechanism and the drum 25 for preventing splashing of the solvent upon the drum.

The arrangement is such that the bar 33 can be very easily and quickly reversed in position in the supporting channel 40, for bringing either one of the wiper strips 34 into position for engaging the roller 28 as may be desired.

In Fig. 3, a modified form of moistening pad unit is shown comprising a bar 56 of sponge rubber covered by a wiping member 57 in the form of a tube formed of chamois. It will be understood that this Fig. 3 unit can be placed in four different operative positions within the supporting channel 40 so as to bring an edge portion of ist face into operative engagement with the roller 28.

The arrangement in Fig. 4 is similar to that shown in Fig. 3, except that the bar 56 of sponge rubber in provided with a tube 58 formed of felt in lieu of the tube formed of chamois as shown in Fig. 3. In Fig. 5, a bar 59 of sponge rubber is provided having strips 60 formed of terry cloth secured on its operative face at the edge portions thereof in position to be brought alternatively into engagement with the roller 28 when the bar is mounted in the supporting channel 40.

In Fig. 6, a modified form of moistening unit is shown comprising a bar 61 of hard rubber provided with grooves 62 in its face adjacent to its opposite edge portions, said grooves 62 having strips 63 of felt mounted therein, such strips 63 being of such size as to extend outwardly beyond the face of the block or bar 61 so as to be adapted to have effective engagement with the roller 28 when the bar is substituted for the bar 33 as shown in Fig. 1.

In Fig. 7, a similar bar 61 is provided with a modified form of wiping means mounted therein. In the arrangement of Fig. 7, the wiping means comprises strips 64 of sponge rubber surrounded by tubular members 65 formed of felt.

In Fig. 8, a bar 66 of hard rubber is shown provided with grooves 67 in its face having a different type of wiping members mounted therein. The improved wiping members of this construction comprise metal tubes 68 covered by tubes 69 of felt.

In the arrangement shown in Fig. 9, a block or bar 70 of sponge rubber is provided with a brush 71 secured on one face of the bar with its bristles 72 located at one edge portion of the operative face of the device. The bar 70 is adapted to fit in the channel supporting member 40 in the same position as that occupied by the bar 33 so as to bring the bristles 72 into operative engagement with the face of the roller 28.

In Fig. 10, a bar 73 of sponge rubber is provided having a strip of suede 74 secured to its face, said strip 74 being of the same width as that of the bar so as to provide wiping parts at both edge portions of the face of the bar for engagement with the roller 28.

In the arrangement shown in Fig. 11, a metal bar 75 is provided having flanges 76 as its side edges, such flanges serving with angle bars 77 to provide longitudinally extending grooves at opposite edge portions of the face of the bar 75. Within the grooves, wiping members are mounted each comprising a strip of rubber 78 partially surrounded by a strip 79 of chamois. The arrangement is such that the strips 79 of chamois are adapted alternatively to engage the roller 28 of the construction as shown in Fig. 1.

In the arrangement illustrated in Fig. 12, a modified form of supporting channel for the moistening pad unit is provided. In this construction a channel 80 is provided adapted to be mounted in position in place of the channel 40, such support 80 being provided with downwardly extending arms 80a at its ends corresponding to the arms 41 of the arrangement shown in Figs. 1 and 2. Within the channel support 80, a bar 81 of wood is mounted serving as a backing member for bar 82 of sponge rubber, the bar 82 being cut out to correspond to the shape of the roller 28 so as to present open pores at its surface adjacent to the roller. The arrangement is such that the wiping member 82 serves very effectively for spreading and equalizing the liquid on the face of the roller as the roller rotates.

In Fig. 13, the bar member 83 is made of felt, and the wiper member 84 is in the form of a sheet of rubber composition such as the product available in the market and known as cropax. The bar 83 is of a size to fit snugly within the channel supporting member 40.

In the Fig. 14 construction, a bar 85 of felt is provided covered by a wiping member in the form of a tube 86 of chamois and arranged so as to fit within the channel supporting member 40 in any of four different adjusted positions.

In Fig. 15, a bar 87 of cork is provided covered by a wiping member 88 in the form of a tube of fabric also arranged for convenient substitution in place of the unit comprising the bar 33.

In the modified form of device as shown in Fig. 16, a bar 89 of sponge rubber is shown having mounted on its face a sheet 90 of smooth rubber extending the full width of the bar 89 so as to be insertable in either of two alternative positions within the channel 40. It has been found that a smooth rubber wiper member is effective for spreading and equalizing the solvent upon the roller 28 even though such member 90 is not absorbent.

The arrangement in Fig. 17 is similar to that shown in Fig. 16, except that the bar 91 is formed of felt rather than of sponge rubber.

In the construction of Fig. 18, a bar 92 of sponge rubber is provided having strips 93 of fur secured along the edge portions of its operative face in position alternatively to engage the roller 28 when the unit is in position in the channel supporting member 40.

By the arrangement above described, including a considerable number of alternative forms capable of being substituted one for the other, highly effective means has been provided for applying a very thin uniform film of solvent to the face of a roller. While the forms of structure as illustrated are preferred, the invention is not to be limited to the arrangement shown except so far as the claims are so limited, since changes might well be made in the structure without departing from the invention.

We claim:

1. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member mounted on said supporting member so as to be movable thereby into pressure relationship with said roller and adjustable manually on the supporting member for bringing different face portions of the pad member into operative position, and wiper means mounted on the face of said pad member at a plurality of different face portions thereof in such position that upon movements of the supporting member toward the roller a selected portion of the wiper means is pressed against the face of the roller as controlled by the adjustment of the pad member.

2. A wiper device for distributing moisture on a roller of a wet process duplicating machine for the application of a film of the moisture to a sheet moving forwardly in contact with the roller, comprising in combination a supporting member movable toward and from said roller, a pad member mounted on said supporting member so as to be movable thereby into pressure relationship with said roller and reversible manually on the supporting member for bringing different face portions of the pad into operative position, wiper means of absorbent material mounted on the face of said pad member at a plurality of different face portions thereof in such position that upon movements of the supporting member toward the roller a selected portion of the wiper means is pressed against the face of the roller as controlled by the adjustment of the pad member, and yielding means adapted normally to press said pad member against said roller.

3. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member formed of resilient compressible material on said supporting member so as to be movable thereby into pressure relationship with said roller and adjustable manually on the supporting member for bringing different face portions of the pad member into operative position, and wiper means mounted on the face of said pad member at a plurality of different face portions thereof in such position that upon movements of the supporting member toward the roller a selected portion of the wiper means is pressed against the face of the roller as controlled by the adjustment of the pad member.

4. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member in the form of an elongated bar of resilient compressible material on said supporting member so as to be movable thereby into pressure relationship with said roller and adjustable manually on the supporting member for bringing different face portions of the pad member into operative position, and wiper means mounted on the face of said pad member at its opposite edge portions in such position that upon movements of the supporting member toward the roller a selected portion of the wiper means is pressed against the face of the roller as controlled by the adjustment of the pad member.

5. A wiper device for distributing moisture on a roller of a wet process duplicating machine for the application of a film of moisture to a sheet moving forwardly in contact with the roller, comprising in combination a supporting member in the form of a channel movable toward and from said roller, means for moving the supporting member toward the roller, a pad member in the form of an elongated bar of resilient compressible material having a snug working fit in said channel so as to be held normally in operative position in the channel but readily reversible manually therein and movable thereby into pressure relationship with said roller, and wiper means mounted on the face of said pad member at a plurality of different face portions thereof in such position that upon movements of the supporting member toward the roller a selected portion of the wiper means is pressed against the face of the roller as controlled by the adjustment of the pad member.

6. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member formed of resilient compressible material on said supporting member so as to be movable thereby into pressure relationship with said roller and adjustable manually on the supporting member for bringing different face portions of the pad member into operative position, and wiper means in the form of absorbent sheet material covering at least the edge portions of one face of the pad member so that upon movements of the supporting member toward the roller a selected portion of the wiper means is pressed against the face of the roller as controlled by the adjustment of the pad member.

7. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member formed of resilient compressible material on said supporting member so as to be movable thereby into pressure relationship with said roller and adjustable manually on the supporting member for bringing different face portions of the pad member into operative position, and wiper means in the form of a sheet of absorbent material covering completely one face of said pad member so that upon movements of the supporting member toward the roller a selected portion of the wiper means is pressed against the face of the roller as controlled by the adjustment of the pad member.

8. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member formed of resilient compressible material on said supporting member so as to be movable thereby into pressure relationship with said roller and adjustable manually on the supporting member for bringing different face portions of the pad member into operative position, and wiper means in the form of a tube of absorbent material surrounding the pad member so that upon movements of the supporting member toward the roller a selected portion of the wiper means is pressed against the face of the roller as controlled by the adjustment of the pad member.

9. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member in the form of an elongated bar of rubber on said supporting member so as to be movable thereby into pressure relationship with said roller and adjustable manually on the supporting member for bringing different face portions of the pad member into operative position, and wiper means mounted on the face of said pad member at its opposite edge portions in such position that upon movements of the supporting member toward the roller a selected portion of the wiper means is pressed against the face of the roller as controlled by the adjustment of the pad member.

10. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member in the form of an elongated bar of rubber on said supporting member so as to be movable thereby into pressure relationship with said roller and adjustable manually on the supporting member for bringing different face portions of the pad member into operative position, and wiper means in the form of a sheet of absorbent material covering one face of said pad member so that upon movements of the supporting member toward the roller a selected portion of the wiper means is pressed against the face of the roller as controlled by the adjustment of the pad member.

11. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member in the form of an elongated bar of sponge rubber on said supporting member so as to be movable thereby into pressure relationship with said roller and adjustable manually on the supporting member for bringing different face portions of the pad member into operative position, and wiper means in the form of a sheet of absorbent material covering one face of said pad member so that upon movements of the supporting member toward the roller a selected portion of the wiper means is pressed against the face of the roller as controlled by the adjustment of the pad member.

12. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member in the form of an elongated bar of sponge rubber on said supporting member so as to be movable thereby into pressure relationship with said roller and adjustable manually on the supporting member for bringing different face portions of the pad member into operative position, and wiper means in the form of a sheet of felt completely covering one face of said bar.

13. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member in the form of an elongated bar of sponge rubber on said supporting member so as to be movable thereby into pressure relationship with said roller and adjustable manually on the supporting member for bringing at least four different face portions of the pad member into operative position, and wiper means in the form of a tube of felt about said bar so that upon movements of the supporting member toward the roller a selected portion of the wiper means is pressed against the face of the roller as controlled by the adjustment of the pad member.

14. A wiper device for distributing moisture on a roller of a wet process duplicating machine for the application of a film of the moisture to a sheet moving forwardly in contact with the roller, comprising in combination a supporting member movable toward and from said roller, means for moving the supporting member toward the roller, a pad member in the form of an elongated bar of sponge rubber on said supporting member so as to be movable thereby into pressure relationship with said roller and adjustable manually on the supporting member for bringing different face portions of the pad member into operative position, and wiper means in the form of two strips of felt covering opposite marginal portions of one face of said bar so that upon movements of the supporting member toward the roller said strips of felt are brought alternatively into engagement with the face of the roller as controlled by the adjustment of said pad member.

ROBERT F. MORRISON.
ERIC W. PETERSON.